Patented Nov. 18, 1952

2,618,656

UNITED STATES PATENT OFFICE 2,618,656

(ALKYLSULFONAMIDOALKYL) ARYLHYDRAZINES

John R. Thirtle and Arnold Weissberger, Rochester, N. Y., assignors to Eastman Kodak Company, Rochester, N. Y., a corporation of New Jersey No Drawing. Application April 29, 1950, Serial No. 159,140

16 Claims. (Cl. 260—556)

1

This invention relates to (alkylsulfonamidoalkyl) aryl hydrazines and to a process for preparing the same.

The allergenic properties of phenylhydrazine and other hydrazines is well known. In the art of photography the use of the hydrazines has been limited to a certain extent by the fact that it is practically impossible to prevent the worker from coming into contact with the hydrazines and thereby developing an allergy for the materials generally manifested by dermatitis. Recent advances in photography, to be described in more detail hereinafter, have indicated the importance of the hydrazines and have stimulated efforts to lower the allergenic properties of the hydrazines.

We have now succeeded in preparing (alkylsulfonamidoalkyl) aryl hydrazines and have further found that these (alkylsulfonamidoalkyl) arylhydrazines possess markedly lower allergenic properties.

The (alkylsulfonamidoalkyl) aryl hydrazines can be represented by the general formula $$H_2NHN—D—Q—NHSO_2R$$

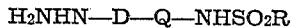

wherein D represents an arylene group of the benzene series, e. g., phenylene, substituted or not, e. g., with alkyl, halogen, etc., Q represents an alkylene group, e. g., methylene, ethylene, propylene, trimethylene, tetramethylene, etc., and R represents an alkyl group, e. g., methyl, ethyl, n-propyl, isopropyl, n-butyl, isobutyl, etc.

A particularly efficacious group of these new compounds can be represented by the general formula $$H_2NHN—D—(CH_2)_n—NHSO_2R$$

wherein D is as above-mentioned, n represents a positive integer of from 1 to 4 and R represents an alkyl group of from 1 to 4 carbon atoms, e. g., methyl, ethyl, n-propyl, isopropyl, n-butyl, isobutyl, etc.

The water-soluble salts or acid addition products of the (alkylsulfonamidoalkyl) aryl hydrazines comprise a part of our invention. (Alkylsulfonamidoalkyl) arylhydrazine salts which can be mentioned are the (alkylsulfonamidoalkyl) arylhydrazine chlorides, bromides, sulfates, nitrates, acetates, phosphates, citrates, borates, etc.

(Alkylsulfonamidoalkyl) arylhydrazines represented by the general formulas are, for example:

o-(β-Methylsulfonamidoethyl) - phenylhydrazine p-(Methylsulfonamidomethyl)-phenylhydrazine

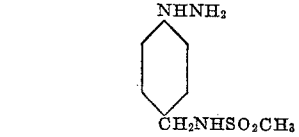

m-(Methylsulfonamidomethyl)-phenylhydrazine

2

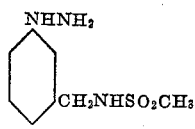

o-(Methylsulfonamidomethyl)-phenylhydrazine

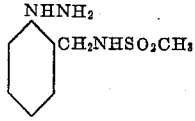

p-(β-Methylsulfonamidoethyl)-phenylhydrazine

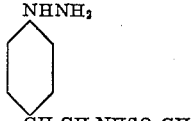

m-(β-Methylsulfonamidoethyl)-phenylhydrazine

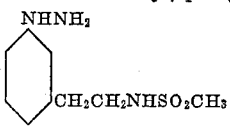

o-(β-Methylsulfonamidoethyl)-phenylhydrazine

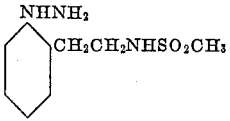

In accordance with our invention, we prepare the (alkylsulfonamidoalkyl) arylhydrazines by diazotization and reduction of (alkylsulfonamidoalkyl) arylamines. That is, an (alkylsulfonamidoalkyl) arylamine, e. g., a m-(alkylsulfonamidoalkyl) aniline is converted to the hydrochloride by dissolving the aniline in aqueous hydrochloric acid solution (methods employing other mineral acids such as phosphoric acid, nitric acid and sulfuric acid can be used but are not required) keeping the salt concentration as high as possible, at this point and in subsequent steps, because of the high solubility of the final product and the difficulty of isolating the product from dilute solutions. If difficulty is experienced in dissolving the aniline compound in the acid, the system can be warmed until solution is complete. The resultant solution of the (alkylsulfonamidoalkyl) aniline salt is then cooled to about −5 to −10° C. and an aqueous solution of an excess of sodium nitrite is gradually added over a period of about 10 minutes. After the required amount of sodium nitrite solution has been added and unreacted (alkylsulfonamidoalkyl) aniline appears to remain as shown by a nitrous acid test, the mixture can be warmed to about 15–20° C. until the unreacted material dissolves and reaction occurs. On the other hand, if unreacted (alkylsulfonamidoalkyl) aniline salt is found to remain after addition of the nitrite solution, a further quantity of nitrite solution should be added to complete the diazotization. The result is to form a diazonium salt which can be represented by the following general formula

X—N=N—D—Q—NHSO$_2$R wherein D, Q and R are arylene, alkylene and alkyl groups, respectively, such as above-mentioned and X represents an anion particularly of a mineral acid, e. g., chloride, phosphate, sulfate, nitrate, etc. In a process, to be described in more detail hereinafter, wherein after formation of the diazonium salt, it is converted to the (alkylsulfonamidoalkyl) aryldiazosulfonate, X in the general formula represents the anion —SO$_3$M wherein M is an alkali metal, e. g., sodium and potassium. A particularly efficacious group of these diazonium salts can be represented by the following general formula Cl—N=N—D—(CH$_2$)$_n$—NHSO$_2$R wherein D is as above-mentioned, $n$ represents a positive integer of from 1 to 4 and R represents an alkyl group of from 1 to 4 carbon atoms such as above-mentioned.

Following diazotization the diazonium salt can be reduced by one of several methods taking suitable precautions. As set forth hereinafter in more detail in the examples, the solution of diazonium salt can now be added to a cold alkali metal sulfite, e. g., sodium sulfite, solution to reduce the diazonium salt to the corresponding hydrazine hydrochloride. If the hydrazine hydrochloride remains in solution, the solution can be decolorized by the addition of a small quantity of zinc dust and after filtration the hydrazine salt can be isolated from the solution by concentration on a steam bath and cooling the concentrate to allow the hydrazine salt to crystallize out.

Alternately, after diazotization of the (alkylsulfonamidoalkyl) aniline the solution can be added to a solution of alkali metal sulfite, e. g., sodium sulfite, containing an insufficient amount of sodium sulfite (1 molecular equivalent) to reduce the diazonium salt to form the (alkylsulfonamidoalkyl) aryl diazosulfonate suspended in the solution which is then filtered off, dissolved in aqueous acetic acid solution and reduced with zinc dust and acid such as acetic acid to the hydrazinesulfonate which separates out as a white crystalline solid. After filtering off the hydrazinesulfonate, it is dissolved in aqueous hydrochloric acid solution as a result of which the hydrazinesulfonate is hydrolyzed to the hydrazine hydrochloride and can be readily recovered from the solution in a high degree of purity.

In accordance with our invention, the (alkylsulfonamidoalkyl) arylhydrazines can be obtained by converting an (alkylsulfonamidoalkyl) aniline to the hydrazinesulfonate, as above-mentioned, then suspending the same in absolute alcohol and while heating, passing in gaseous hydrogen chloride for about ½ to 1 hour. No appreciable visible change in the system occurs during this time, and the suspension of the (alkylsulfonamidoalkyl) aniline hydrazinesulfonate is thereby converted to a suspension of the corresponding (alkylsulfonamidoalkyl) aryl hydrazine hydrochloride from which the same can be obtained in a high degree of purity by filtration.

In accordance with our invention, the (alkylsulfonamidoalkyl) aryl hydrazines can be prepared by first preparing a solution of the diazonium chloride of an (alkylsulfonamidoalkyl) aniline as above-mentioned and then adding to this solution, cooled to about 0 to —15° C., acid stannous chloride solution (2 molecular equivalents +10%) to reduce the diazonium chloride to the corresponding arylhydrazine salt. In case the arylhydrazine precipitates out as the hydrochloride salt, it can at once be filtered off and the precipitate washed with dilute hydrochloric acid solution to yield a very pure compound. If the precipitated hydrochloride salt is too soluble to be washed, it can be dissolved in water and the tin salt impurity removed by passing hydrogen sulfide into the solution, filtering off the precipitated tin sulfide and crystallizing the arylhydrazine hydrochloride from the filtrate. Alternately, after reduction of the aryldiazonium chloride with stannous chloride solution and the tin double salt of the (alkylsulfonamidoalkyl) aryl hydrazine has been found to have precipitated out, as shown by dissolving a sample of the precipitate in water and passing in hydrogen sulfide, the tin double salt can be dissolved in water, treated with hydrogen sulfide, the tin sulfide filtered off, the filtrate concentrated, and the hydrazine hydrochloride allowed to crystallize out.

The following examples will serve to illustrate further the preparation of the above hydrazines, and the intermediates used in preparing the hydrazines.

*Example 1.—m-(methylsulfonamidomethyl)-phenylhydrazine*

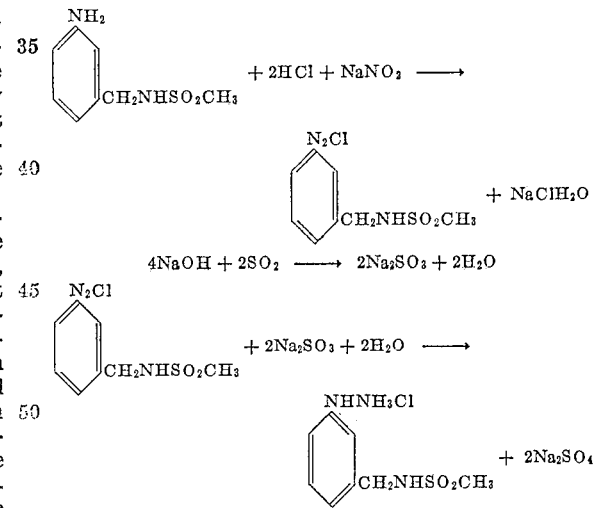

In a 500 cc. 3-necked flask 20.0 g. (0.1 mole) of m-(methylsulfonamidomethyl)-aniline was dissolved in a solution of 20.0 cc. of concentrated hydrochloric acid (8.8 g. HCl, 0.24 mole) in 200 cc. of water, cooled to 0°, and in the course of 10 minutes diazotized with a solution of 6.9 g. (0.1 mole) of sodium nitrite in 25 cc. of water. The solution was allowed to stand at 0° for 20 minutes before reduction.

In a 1—l. beaker 20.0 g. (0.48 mole) of 97% sodium hydroxide was dissolved in 150 cc. of water; the beaker was placed in an ice bath, and cylinder sulfur dioxide was bubbled in to pH 6 (Hydrion paper). The solution was cooled to 0°, and the diazonium chloride solution was poured in all at once. The bright red-orange solution was allowed to stand on a steam bath (solution temperature 75°) for 4 hours, then filtered hot. In the large beaker the volume had decreased to about 225 cc. Beaker and filter were washed with 25 cc. of water. The combined filtrate and washings were cooled to 0°, and 250 cc. of cold concentrated hydrochloric acid was added. The mixture was again cooled to 0° and filtered by suction on sintered glass. The precipitate was washed with a little ethanol and with ether, then dried in air. It weighed 35.2 g.

The material was boiled once with 300 cc. absolute ethanol. The residue was discarded; the filtrate was cooled and filtered by suction. The mother liquor was diluted with ether for a second crop. The combined products were washed with ether and dried in air to 9.6 g. (38%) pinkish powder melting with charring and gas evolution at 175–180°.

Further recrystallization did not alter the melting point:

|  | C | H | Cl | N | S |
|---|---|---|---|---|---|
| Found | 38.7 | 5.9 | 14.1 | 16.8 | 12.4 |
| Calculated for $C_8H_{14}ClN_3O_2S$ | 38.17 | 5.61 | 14.08 | 16.69 | 12.74 |

The free base of the compound was obtained by dissolving the hydrazine salt in water and neutralizing with alkali.

The starting material used in the above synthesis was obtained from m-nitrobenzyl amine hydrochloride reacted with methanesulfonyl chloride in the presence of alkali, and crystallizing from alcohol to M. P. 71–74° C., followed by the reduction of the nitro group with Raney nickel and hydrogen and crystallization from acid alcohol solution to M. P. 205–215° C.

*Example 2.—p-(methylsulfonamidomethyl)-phenylhydrazine*

This hydrazine was prepared by the method of Example 1 from p-(methylsulfonamidomethyl)-aniline obtained from p-nitrobenzyl amine hydrochloride. The hydrazine hydrochloride showed charring in a capillary tube at 150° C. and melted with gas evolution at 175–180° C.

The ortho-isomer of the hydrazine can be prepared in a similar manner from isomeric starting materials.

*Example 3.—p-(β-methylsulfonamidoethyl)-phenylhydrazine*

This hydrazine was prepared by a method similar to that of Example 1 according the following reaction and procedure:

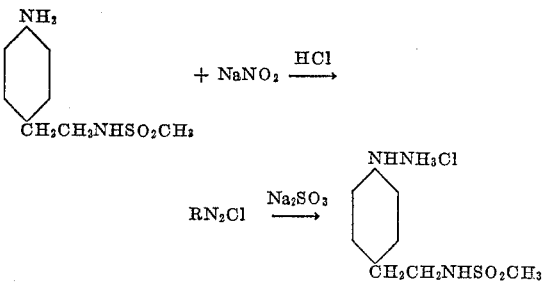

The p-(β-methylsulfonamidoethyl)-aniline, 21.4 g. (0.1 mole), was placed in a 500 cc. Erlenmeyer flask and a mixture of 26 cc. of concentrated hydrochloric acid and 25 g. of ice was added. To the stirring suspension of the amine hydrochloride was added 25 g. more ice followed by a solution of 7.25 g. (0.105 mole) of sodium nitrite in 15 cc. of water over a period of 5 minutes.

A solution of sodium sulfite was prepared by diluting 26.3 cc. of 50% sodium hydroxide (contains 20 g.=0.5 mole NaOH) to 150 cc. and passing in gaseous sulfur dioxide until the pH was on the acid side.

The sulfite solution was cooled to 5° and 25 g. of ice was added. The filtered diazonium solution was added all at once with stirring. The bright yellow diazo sulfonate separated almost immediately and thickened the reaction mixture. (This diazosulfonate may be collected and converted to the hydrazine hydrochloride as described above, i. e., by reduction to the hydrazinesulfonate with zinc dust and acetic acid followed by cleavage to the hydrazine hydrochloride by alcoholic or aqueous hydrogen chloride.) The stirring was continued while warming gradually to 60–70° in a water bath. After one hour at this temperature 20 cc. of concentrated hydrochloric acid was added. The reaction mixture was then heated at 60–70° for two hours longer without stirring. Addition of 4 g. of zinc dust removed the last of the yellow color. The reaction mixture was filtered and 100 cc. of concentrated hydrochloric acid was added to the filtrate. The solution was seeded, cooled to 20° under running water then to −8° in an ice-salt mixture. The white crystals were collected, washed with two 50 cc. portions of a 1:1 mixture of water and hydrochloric acid cooled to 0°. Final drying in a vacuum desiccator over sulfuric acid gave 21 g. (79.2%), melting at 195° (dip). Recrystallization by dissolving in 126 cc. of water, adding 42 cc. of concentrated hydrochloric acid and cooling at 0° for one hour gave 19.5 g. (93% recov.) of pure white prisms, M. P. 202° (dip).

The starting material for the above synthesis was obtained by nitration of β-phenylethylamine −½ $H_2SO_4$ to give p-nitro-β-phenylethylamine, followed by reaction with methanesulfonyl chloride and alkali to give p-(β-methyl sulfonylamidoethyl)-nitro benzene M. P. 120–121° C., then reducing the compound with Raney nickel and hydrogen to the corresponding amine M. P. 103–4° C.

The meta isomer of the above hydrazine can be prepared by reduction of 3-aminophenylacetonitrile in methanol and liquid ammonia with nickel catalyst to give β-(3-aminophenyl)-ethyl amine, followed by reaction with phenylmethane sulfonate, distilling phenol out under vacuum, and crystallizing the resulting m-(β-methylsulfonamidoethyl)-aniline from alcohol to M. P. 83–84.5° C. The product is then diazotized and reduced to the hydrazine salt as outlined in the above reaction and procedure.

The o-isomer of these hydrazines can be prepared in a similar manner. The procedures of Examples 1, 2 and 3 are likewise applicable to the preparation the other o, m and p-(alkylsulfonamido alkyl)-phenylhydrazines, represented by the general formulas given above, in which cases the corresponding aminophenylalkylamines or nitrophenyl alkyl halides, having if desired other nuclear substituents such as halogen or alkyl, etc., can be selected as starting materials for reactions, respectively, with the selected phenylalkyl sulfonate or alkyl sulfonylhalide, the alkyl groups of which preferably contain from 1 to 4 carbon atoms, e. g., methyl, ethyl, propyl, n-butyl, etc.

The hydrazines of the invention are particularly suitable for use in the photographic process of the Ives U. S. patent application, Serial No. 159,150 filed concurrently herewith, now U. S. Patent 2,563,785. According to that process, an emulsion of the internal latent image type, such as that disclosed in the Davey and Knott U. S. application, Serial No. 82,914, filed March 22, 1949 now U. S. Patent 2,592,250, is exposed and then developed in a developer containing, in addition to developing agent, one of the hydrazines of our invention. The result is to obtain a direct-positive image in the emulsion layer.

This emulsion is prepared by first forming in the absence of ammonia and in one or more stages silver salt grains consisting at least partly of a silver salt which is more soluble in water than silver bromide, subsequently converting the grains to silver bromide or silver bromo-iodide and if the silver iodide content of the emulsion is less than 6% calculated on the total silver halide, treating such grains with an iodine compound to bring the silver iodide up to at least 6%, ripening preferably in the absence of ammonia and then either washing out some of the soluble salts or washing out the whole of the soluble salts, followed by the addition of soluble salts such as soluble chloride or bromide. An example of an emulsion made in this way is as follows:

Solution No. 1:              at 40° C.
    Inert gelatin _____ grams__ 20
    KCl _____ grams__ 20
    Water _____ cc.___ 560
Solution No. 2:              at 45° C.
    KCl _____ grams__ 100
    Water _____ cc.___ 520

Solution No. 3:              at 45° C.
    $AgNO_3$ _____ grams__ 195
    Water _____ cc.___ 520
Solution No. 4:              at 45° C.
    KBr _____ grams__ 160
    KI _____ grams__ 40
    Water _____ cc.___ 500

Run solutions Nos. 2 and 3 simultaneously into solution No. 1 in a vessel, taking 90 seconds to do this. Then ripen for 1 minute at 45° C. Next add solution No. 4, then ripen for 20 minutes at 45° C. Next add 235 grams of inert gelatine (dry). Then ripen at 45° C. for 15 minutes during which time the gelatine dissolves. Set and shred the emulsion and then wash until free from all soluble bromide and then add about 150 cc. of 10% solution of KCl (by weight), and then add water to make 3½ litres.

An internal latent image type of silver halide emulsion may be defined as one which, when a test portion is exposed to a light intensity scale for a fixed time between 1/100 and 1 second, and developed for 4 minutes at 20° C. in the ordinary, "surface" developer (developer I), exhibits a maximum density not greater than ⅕ the maximum density obtained when the same emulsion is equally exposed and developed for 3 minutes at 20° C. in an internal type developer (developer II). Preferably the maximum density obtained with the surface developer is not greater than 1/10 the maximum density obtained when the same emulsion is developed in the internal type developer. Stated conversely, an internal latent image emulsion, when developed in an internal type developer (developer II) exhibits a maximum density at least 5, and preferably at least 10, times the maximum density obtained when the same emulsion is exposed in the same way and developed in a surface developer (developer I).

The process of forming the image in the emulsion is carried out by exposing the internal latent image emulsion layer to an object or image and then placing the exposed emulsion layer directly in a silver halide developing solution containing one or more of the hydrazine compounds, of the present invention or disclosed in the Ives invention. Developing agents suitable for use in the process of my invention include the usual phenolic or aminophenol type developing agents, such as N-methyl-p-aminophenol sulfate, p-benzohydroquinone, catechol, 2-methyl hydroquinone, 2-chlorohydroquinone, p-aminophenol, and pyrogallol. The developing solution should have a pH of from 10 to 13, depending upon the degree of activity of the particular hydrazine compound which it contains, although the preferred range with most hydrazine compounds is from pH 11 to pH 12.

The following is a typical developer composition:

N-methyl-p-aminophenol sulfate _____ g.___ 5
Hydroquinone _____ g.___ 10
Sodium sulfite _____ g.___ 75
Sodium metaborate _____ g.___ 30
Sodium hydroxide _____ g.___ 10
Phenyl hydrazine hydrochloride _____ g.___ 0.5
Water to 1 liter.

An ordinary, surface-type developer, that is, one which develops an image only on the surface of the grains of an internal latent image emulsion, is the following:

*Developer I* p-Hydroxyphenylglycine _____ g.___ 10
Sodium carbonate (crystals) _____ g.___ 100
Water to 1 liter.
Development time, 4 min. at 20° C.

An internal type developer, that is, one which develops an image inside the grains of an internal latent image emulsion, is the following:

*Developer II*

Hydroquinone _____ g.___ 15
Monomethyl-p-aminophenol sulfate _____ g.___ 15
Sodium sulfite (anhydrous) _____ g.___ 50
Potassium bromide _____ g.___ 10
Sodium hydroxide _____ g.___ 25
Sodium thiosulfate (crystals) _____ g.___ 20
Water to 1 liter.
Development time, 3 min. at 20° C.

We claim:
1. A water-soluble salt of a hydrazine represented by the formula

$H_2NHN-D-(CH_2)_n-NHSO_2R$ wherein D represents a divalent mononuclear arylene group of the benzene series, $n$ represents a positive integer of from 1 to 4 and R represents an alkyl group of from 1 to 4 carbon atoms.

2. A water-soluble salt of a hydrazine represented by the formula

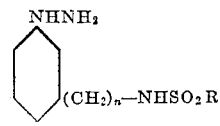

wherein $n$ represents a positive integer of from 1 to 4 and R represents an alkyl group of from 1 to 4 carbon atoms.

3. A water-soluble salt of a hydrazine represented by the formula

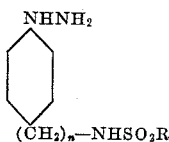

wherein $n$ represents a positive integer of from 1 to 4 and R represents an alkyl group of from 1 to 4 carbon atoms.

4. A water-soluble salt of a hydrazine represented by the formula

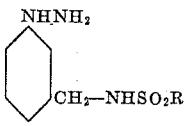

wherein R represents an alkyl group of from 1 to 4 carbon atoms.

5. A water-soluble salt of a hydrazine represented by the formula

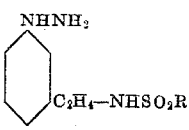

wherein R represents an alkyl group of from 1 to 4 carbon atoms.

6. A water-soluble salt of a hydrazine represented by the formula

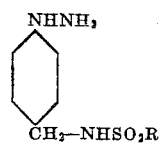

wherein R represents an alkyl group of from 1 to 4 carbon atoms.

7. A water-soluble salt of a hydrazine represented by the formula

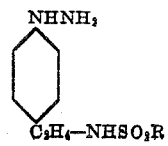

wherein R represents an alkyl group of from 1 to 4 carbon atoms.

8. A water-soluble salt of m-(methylsulfonamidomethyl-phenylhydrazine.

9. A water-soluble salt of p-(methylsulfonamidomethyl)-phenylhydrazine.

10. A water-soluble salt of m-($\beta$-methylsulfonamidoethyl)-phenylhydrazine.

11. A water-soluble salt of p-($\beta$-methylsulfonamidoethyl)-phenylhydrazine.

12. A compound selected from the group consisting of hydrazines represented by the formula

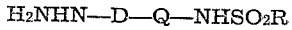

wherein D represents a divalent mononuclear arylene group of the benzene series, Q represents an alkylene group, and R represents an alkyl group, and water-soluble salts thereof.

13. m-(Methylsulfonamidomethyl)-phenylhydrazine hydrochloride.

14. p-(Methylsulfonamidomethyl)-phenylhydrazine hydrochloride.

15. m-($\beta$-Methylsulfonamidoethyl)-phenylhydrazine hydrochloride.

16. p-($\beta$-Methylsulfonamidoethyl)-phenylhydrazine hydrochloride.

JOHN R. THIRTLE.
ARNOLD WEISSBERGER.

REFERENCES CITED

The following references are of record in the file of this patent:

UNITED STATES PATENTS

| Number | Name | Date |
| --- | --- | --- |
| 2,550,661 | Allen | May 1, 1951 |

OTHER REFERENCES

Beilstein, "Handbuch der Organishchen Chemic" vol. 15, (1932), pages 67–68.